(12) United States Patent
Lowery (10) Patent No.: US 7,866,345 B2
(45) Date of Patent: Jan. 11, 2011

(54) NON-CLOGGING FLOW RESTRICTION FOR PRESSURE BASED FLOW CONTROL DEVICES

(75) Inventor: Patrick A. Lowery, Greer, SC (US)

(73) Assignee: Circor Instrumentation Technologies, Inc., Spartanburg, SC (US)

( * ) Notice: Subject to any disclaimer, the term of this patent is extended or adjusted under 35 U.S.C. 154(b) by 649 days.

(21) Appl. No.: 11/863,988

(22) Filed: Sep. 28, 2007

(65) Prior Publication Data

US 2009/0084448 A1   Apr. 2, 2009

(51) Int. Cl.
*F15D 1/04* (2006.01)

(52) U.S. Cl. ............................... 138/42; 138/39; 138/37

(58) Field of Classification Search ................... 138/37, 138/39, 42
See application file for complete search history.

(56) References Cited

U.S. PATENT DOCUMENTS

| | | | | |
|---|---|---|---|---|
| 1,559,156 A | | 10/1925 | Bullock ..................... 138/44 X |
| 1,735,789 A | | 11/1929 | Powell ........................ 181/273 |
| 2,400,161 A | * | 5/1946 | Allerton et al. ............... 138/42 |
| 3,586,104 A | * | 6/1971 | Hyde ......................... 166/142 |
| 3,754,398 A | | 8/1973 | Mattavi ....................... 60/298 |
| 3,921,754 A | | 11/1975 | Hess ............................ 181/212 |
| 3,970,439 A | | 7/1976 | Murphy ....................... 55/306 |
| 4,043,360 A | * | 8/1977 | Yaron ......................... 138/42 |
| 4,704,145 A | | 11/1987 | Norris et al. .................. 55/306 |
| 4,715,395 A | | 12/1987 | Mainelli et al. ............... 138/42 |
| 4,825,652 A | | 5/1989 | Curran ........................ 60/309 |
| 5,215,560 A | | 6/1993 | Lee .............................. 96/330 |
| 512,681 A | | 1/1994 | Clute .......................... 55/446 |
| 5,323,657 A | | 6/1994 | Vander Heyden ........ 73/861.02 |
| 5,427,610 A | | 6/1995 | Croker ........................ 95/114 |
| 5,544,480 A | | 8/1996 | Edwards ...................... 60/243 |
| 5,672,821 A | | 9/1997 | Suzuki ..................... 138/42 X |
| 5,713,970 A | | 2/1998 | Raring ........................ 96/297 |
| 5,819,683 A | | 10/1998 | Ikeda et al. ................. 118/724 |
| 5,865,205 A | | 2/1999 | Wilmer ........................ 137/2 |
| 6,119,710 A | | 9/2000 | Brown ......................... 137/14 |
| 6,152,162 A | | 11/2000 | Balazy et al. ............... 137/110 |
| 6,428,609 B1 | | 8/2002 | Moore et al. .................. 95/272 |
| 6,547,844 B2 | | 4/2003 | Rikyuu et al. .............. 55/315.1 |
| 6,936,085 B2 | | 8/2005 | DeMarco ..................... 55/324 |

FOREIGN PATENT DOCUMENTS

| | | |
|---|---|---|
| DE | 2460667 | 7/1975 |
| EP | 0822345 A2 | 4/1998 |
| FR | 1088797 A | 3/1955 |
| GB | 685409 A | 1/1953 |
| JP | 55086519 A | 6/1980 |
| JP | 10328647 A | 12/1998 |
| WO | 2005017415 A1 | 2/2005 |

* cited by examiner

*Primary Examiner*—Patrick F Brinson
(74) *Attorney, Agent, or Firm*—McNees Wallace & Nurick LLC (57) ABSTRACT

A flow metering device includes at least two stackable modular bodies including at least one set of adjacent modular bodies, each modular body having an orifice for modulating fluid flow therethrough. The modular bodies arranged such that the orifices between adjacent modular bodies are offset from each other. Adjacent stacked modular bodies define a chamber for trapping particulates entrained in fluid flow without obstructing fluid flow through the orifices.

21 Claims, 5 Drawing Sheets

NON-CLOGGING FLOW RESTRICTION FOR PRESSURE BASED FLOW CONTROL DEVICES

CROSS-REFERENCE TO RELATED APPLICATIONS

This Application is related to application Ser. No. 11/864,133, filed contemporaneously with this Application on Sep. 28, 2007, entitled "FILTER MONITOR-FLOW METER COMBINATION SENSOR" assigned to the assignee of the present invention and which is incorporated herein by reference in its entirety.

BACKGROUND OF THE INVENTION

The present invention relates generally to stackable modular bodies for use in a flow metering device. Fluid flow through the flow metering device is modulated by an orifice formed in the modular bodies.

In a flow metering device, flow restrictions are used to create a pressure differential that can be used either directly or indirectly to measure flow rate with differential pressure measurement methods and pressure versus flow calibration curves. Orifice plates, wedge meters, and other types of differential flow measurements have been used for many years in the chemical and petrochemical process industry (and others) for typically large flow rates.

For a wide variety of industries such as semiconductor manufacturing or custody transfer of natural gas, flow measurement accuracy is extremely important. In other industries, such as petrochemical process analyzer flows or other general flow monitoring applications, the overall accuracy of a flow measurement is not as important as repeatability of those measurements over time. Stated another way, industries, such as the petrochemical industry, are typically more concerned with whether or not fluid flow occurs within a specific range. As long as the fluid flow rate does not dramatically change from day-to-day due to measurement repeatability error, then the user can assume that the fluid flow is stable or the process/system is stable. Conversely, the user can assume that measured flow fluctuation/changes are caused by an upset in the process, requiring attention.

In addition, petrochemical and related "dirty" industrial applications in which particulates are entrained in the fluid flow, continuous problems are encountered with the particulates clogging flow metering devices, especially those devices operating with small fluid flow passages. That is, clogging has been one of the shortfalls of orifice based flow rate measurement constructions operating under small flow rates, which constructions using small flow restrictions. Therefore, it is optimal to have a flow restriction construction that can meet the overall goals of simplified flow equations for ease of calibration and system repeatability, in addition to having the ability to not clog for extended periods of time.

Petrochemical process or analytical equipment is expected to have product lifecycles over 10 years, while other flow measurement in industries such as the semiconductor industry are only expected to last 1-3 years before replacement is required. Therefore, it is expected that the flow metering equipment must also be rugged and somewhat "fail-safe".

What is needed is a reliable flow measurement device that has increased resistance to clogging.

SUMMARY OF THE INVENTION

In a differential flow measurement framework, typically the flow restriction can be categorized as either density dependent or viscosity dependent. The volumetric flow rate can be generally expressed for either dependency with the following relationships as shown for equations 1 and 2 as follows:

$$\dot{Q} = \frac{dV}{dt} = \kappa \frac{\pi d^2 \Delta P}{4\eta L} = K_{laminar} \frac{\Delta P}{\eta} \quad [1]$$

for laminar or porous flow (viscosity dependent) (Darcy's law)

Where $$K_{laminar} = \frac{\kappa \pi d^2}{4L}$$

($K_{laminar}$ becomes a geometry dependent constant)

$$\dot{Q} = \frac{dV}{dt} = C_d A Y \sqrt{\frac{1}{1-\beta^4}} \sqrt{\frac{2\Delta P}{\rho}} = K_{orifice} Y \sqrt{\frac{\Delta P}{\rho}} \quad [2]$$

for flow across an orifice (density dependent)

Where $$K_{orifice} = .3535 C_d \pi d_2^2 \sqrt{\frac{1}{1-\beta^4}}$$

($K_{orifice}$ becomes a geometry dependent constant)

with $$\beta = \frac{d_2}{d_1};$$

the expansion factor Y=1 for liquid flows

Where:
  d=Hydraulic diameter or flow passage diameter of porous restriction or laminar element
  $d_1$=upstream passage diameter
  $d_2$=orifice passage diameter
  A=Hydraulic area or flow passage area
  $\Delta P$=Pressure differential across restriction ($P_{upstream}-P_{downstream}$)
  Y=dimensionless expansion factor (for expansion of gases across an orifice, dependent on gas compressibility and specific heat ratios)
  $C_d$=discharge coefficient (i.e., a flow "efficiency" factor that is dependent on the geometry of the orifice)
  L=Length over which the pressure drop occurs
  $\eta$=Fluid absolute viscosity
  $\rho$=fluid density (either gas or liquid)
  $\kappa$=Material permeability (for porous media)
  $\dot{Q}$=volumetric flow rate (volume per unit time)

An embodiment of a flow restriction construction of the present disclosure permits a user to arrange a stack or arrangement of juxtaposed disks or modular bodies in series with offsetting flow passages in different configurations and passageway dimensions or units of measure. Each modular body has a predetermined flow restriction magnitude. When multiple modular bodies are stacked in an alternating arrangement, the combined or aggregate flow restriction magnitude increases. The simplified Darcy-Weisbach flow equation 3 for pipes shows the general relationship between this flow restriction magnitude and flow rate.

$$\Delta P = K_v \frac{\rho V^2}{2} \text{ and } V = \frac{\dot{Q}}{A} \quad [3]$$

$$\therefore \Delta P = \frac{K_v \rho}{2} \left(\frac{\dot{Q}}{A}\right)^2$$

$$\dot{Q} = A \sqrt{\frac{2\Delta P}{K_v \rho}} \text{ OR } \dot{Q} = C \sqrt{\frac{\Delta P}{\rho}}$$

$$\text{where } C = A \sqrt{\frac{2}{K_v}}$$

Where
V=fluid velocity
$K_v$=K-factor, pressure drop coefficient, or resistance to flow factor
C=flow coefficient Note that both equations 2 and 3 are virtually identical and therefore can be used for orifice style flow restrictions with similar results. The only difference between the two equations is that equation 2 incorporates an expansion factor for gaseous flows.

Each flow restriction element that is stacked will have its own "K-factor" ($K_v$) shown above. The K-factor is commonly called the pressure drop coefficient, indicating the resistance to flow coefficient. The inverse of the K-factor is commonly called the flow coefficient. When expressed in imperial units, the flow coefficient is denoted as $C_v$. When these restriction elements are serially arranged with each other, they are summed up with the following relationship:

$$\left(\frac{1}{C_{total}}\right)^2 = \sum \left(\frac{1}{C_{individual}}\right)^2 \text{ OR } C_{total} \quad [4]$$

$$= \sqrt{\frac{1}{\sum \left(\frac{1}{C_{individual}}\right)^2}}$$

If all of the flow restrictions are equal size, then equation 4 can be simplified to form the following expression:

$$C_{total} = \sqrt{\frac{1}{n}} C_{individual} \quad [5]$$

where n=number of restriction members placed in series

If it is desired to tailor a total flow restriction constant, equation 5 can be re-arranged to solve for $C_{individual}$:

$$C_{individual} = \sqrt{n} C_{total} \quad [6]$$

In an example application of equation 6, a flow application requires a total restriction factor of 0.02 to repeatably measure the flow within a given range of pressure sensor. For flow measurement purposes, it is typically desirable to maximize the amount of differential pressure signal coming from the sensor. The user could choose to use a single small flow passage, such as 0.05 units of measure, to create the 0.02 restriction factor. However, this small passageway would be prone to clog if there was an accumulation of particulates larger than 0.05 units of measure. The situation would be improved if several larger flow restrictions were placed in series. For example, four (4) restrictions can be used, in which a flow passage is formed in each of four (4) modular bodies that are disposed in series. By application of equation 6:

n=4 (number of modular bodies)
$C_{total}$=0.02
$C_{individual}$=$(4)^{1/2}$*0.02
$C_{individual}$=0.04

Restriction factor C is directly proportional to cross sectional area and hence, is proportional to the square of passageway diameter. Therefore, the resulting cross sectional area associated with the flow restriction of each of the serially disposed modular bodies can be twice the area required by one flow restriction. In other words, the diameters of the serially disposed flow restrictions are larger, which are less prone to clogging.

The present disclosure relates to a flow metering device including at least two stackable modular bodies and including at least one set of adjacent modular bodies. Each modular body has an orifice for modulating fluid flow therethrough, the at least two modular bodies arranged such that the orifices between adjacent modular bodies are offset from each other. Adjacent stacked modular bodies define a chamber having features for trapping particulates entrained in fluid flow without obstructing fluid flow through the orifices.

The present disclosure relates to a flow metering device including n stackable modular bodies, in which n is an integer greater than 1. Each modular body has an orifice for modulating fluid flow therethrough to define an individual flow coefficient $C_{individual}$. The n modular bodies are collectively arranged to define a collective flow coefficient $C_{total}$, in which $C_{individual}=\sqrt{n}C_{total}$.

The present disclosure still further relates to a flow metering device including at least two stackable modular bodies. Each modular body has an orifice having substantially the same flow coefficient for modulating fluid flow therethrough. The at least two modular bodies are arranged such that the orifices between adjacent modular bodies are offset from each other. Adjacent stacked modular bodies define a chamber for trapping particulates entrained in fluid flow without obstructing fluid flow through the orifices.

The present disclosure yet further relates to a flow metering device including a modular assembly disposed in a seated position in a bore by a resilient device. The modular assembly includes at least two stackable modular bodies including at least one set of adjacent modular bodies. Each modular body has an orifice for modulating fluid flow therethrough, the at least two modular bodies arranged such that the orifices between adjacent modular bodies are offset from each other. Adjacent stacked modular bodies define a chamber having features for trapping particulates entrained in fluid flow without obstructing fluid flow through the orifices. A fluid parameter measuring device is disposed in fluid communication with the modular assembly. In response to a transient overpressure condition, the modular assembly is temporarily urged away from the seated position to relieve the transient overpressure condition to prevent damage to the measuring device.

The present disclosure also may incorporate a version of which the stacked modular bodies may be stacked and then attached into a sliding assembly backed up by a spring element. The spring element may be tailored to provide an array of different force magnitudes. This sliding assembly may serve dual purpose of providing the net flow restriction magnitude for the differential flow sensor; but may also slide away from a valve sealing element to allow fluid to bypass the majority of the restriction assembly. This optional assembly may allow pressure to bypass the flow restriction in the case of an accidental upstream overpressure situation, thereby protecting the sensor from damage and extending the life cycle of the product.

Other features and advantages of the present disclosure will be apparent from the following more detailed description of the preferred embodiment, taken in conjunction with the accompanying drawings which illustrate, by way of example, the principles of the disclosure.

BRIEF DESCRIPTION OF THE DRAWINGS

Wherever possible, the same reference numbers will be used throughout the drawings to refer to the same or like parts.

DETAILED DESCRIPTION OF THE INVENTION

Figure 1:
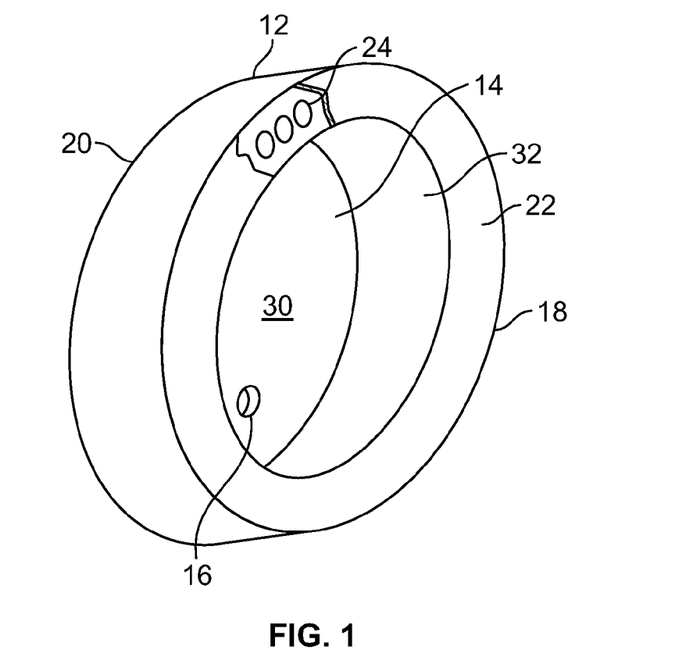
FIGS. 1 and 2 are reverse top perspective views of an embodiment of a modular body for use with a flow control device of the present disclosure.
Figure 2:
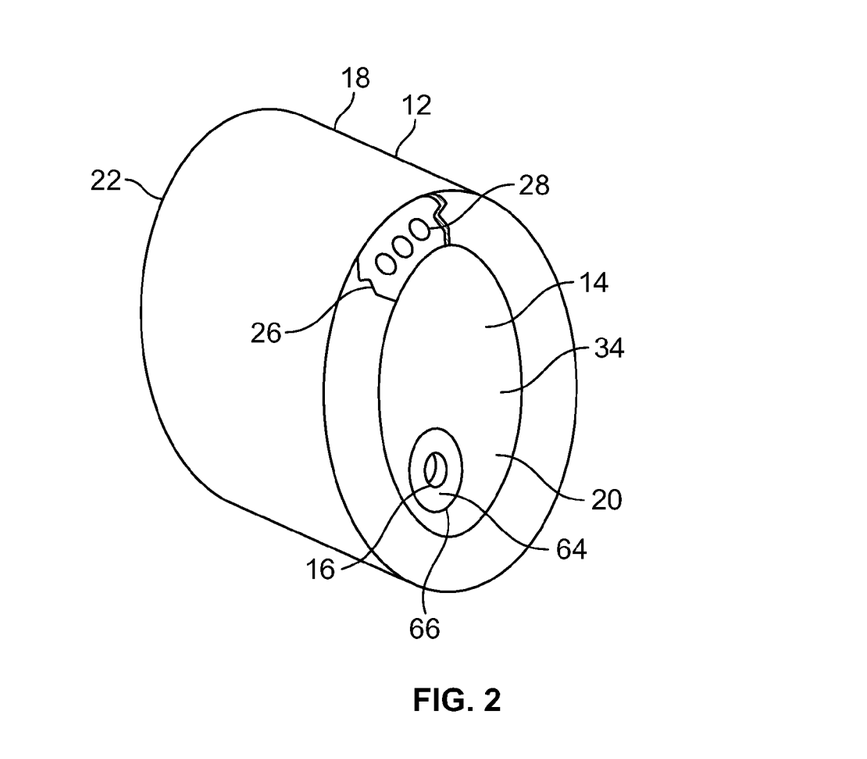
Figure 3:
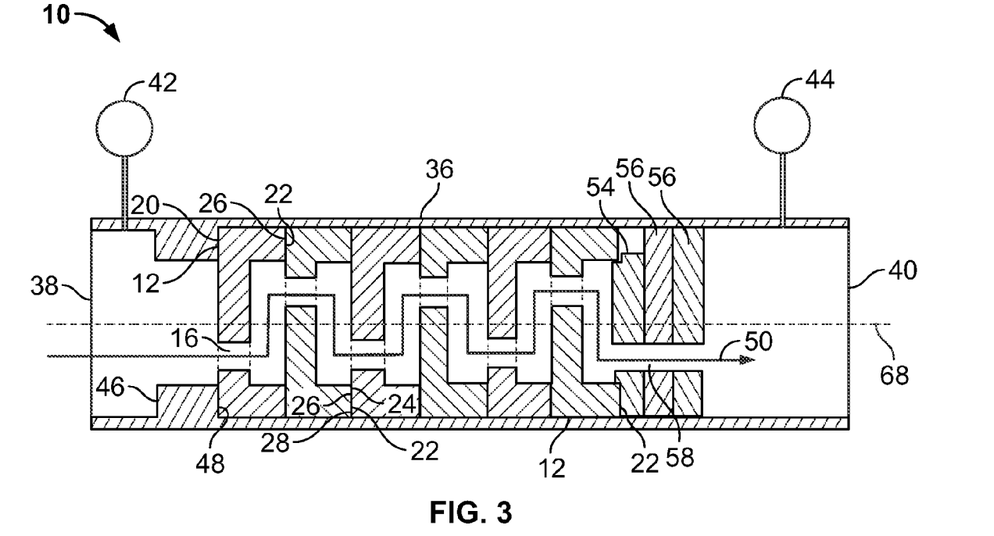
FIG. 3 is a cross sectional view of an embodiment of a flow control device of the present disclosure.

Referring now to the drawings, in FIGS. 1 and 2 in reverse top perspective views, a modular body 12 is shown for use in flow control or flow metering device 10 (see FIG. 3). Modular body 12 has opposed ends 20, 22 and includes a base 14 adjacent to end 20. In one embodiment, base 14 is disk-shaped and has a circular periphery. Alternately, other regular-shaped polygons, i.e., polygons with congruent sides and congruent interior angles, are contemplated. An orifice 16 is formed through base 14, which in one embodiment has a circular shape, although other closed geometric shapes can be used. In one embodiment, orifice 16 is non-centered with respect to base 14. In another embodiment, as shown in FIG. 2, base 14 includes an insert 64 that is installed in an aperture 66 formed in base 14. Orifice 16 is then formed in insert 64. Insert 64 provides the opportunity for modular bodies 12 to be identical to each other and in one embodiment, may be a plastic material formed by injection molding. In addition, insert 64 may be constructed of a material different than the remaining portion of modular body 12. In one embodiment, insert 64 may be constructed of a more robust, i.e., wear resistant, material that permits extended operational use prior to the dimensions of orifice 16 sufficiently changing, thereby necessitating repair or replacement. For example, in such an arrangement and circumstance, only insert 64, and not the entire modular body 12 may require repair or replacement. In one embodiment, insert 64 may be cleaned in an ultrasonic cleaner, and then re-inserted inside modular body 12.

A wall 18 extends from the periphery of base 14 in a direction substantially perpendicular to the base 14, terminating at end 22. In one embodiment, modular body 12 resembles a cupped or "hollowed out" cylinder, such as a circular cylinder. In another embodiment, wall 18 is of substantially uniform thickness and ends 20, 22 are substantially parallel to each other to permit easy end-to-end arrangement of modular bodies 12 for use in a flow metering device.

Figure 4:
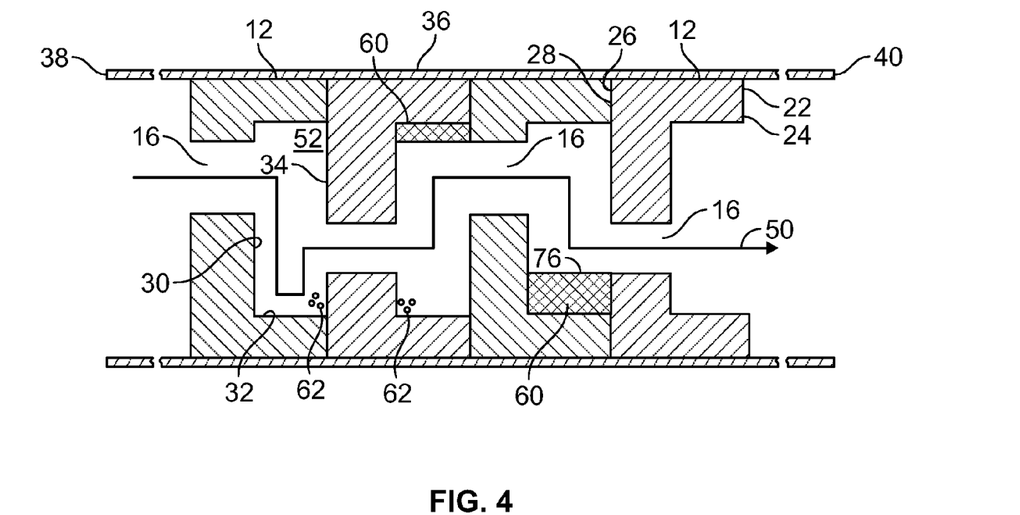
FIG. 4 is an enlarged, partial cross sectional view of modular bodies installed in a flow control device of the present disclosure.

As shown in FIGS. 3 and 4, which are cross sectional views of an embodiment of the flow metering device 10, multiple modular bodies 12 are installed in flow metering device 10 including a housing 36 having opposed ends 38, 40. In one embodiment, fluid parameter measuring instruments, such as pressure gauges 42, 44, pressure gauge 42 is disposed adjacent to end 38 and pressure gauge 44 is disposed adjacent to end 40. Modular bodies 12 are also installed inside of housing 36. That is, as shown, end 20 of modular body 12 is directed inside of housing 36 from end 40 until end 20 abuts a surface 48 of stop 46 of housing 36 that is disposed adjacent to end 38 of housing 36. Once the first modular body 12 has been installed, end 20 of another modular body 12 is similarly directed inside of housing 36 from end 40 until end 20 of the subsequently installed modular body 12 abuts end 22 of the first installed modular body 12. In one embodiment, as shown in FIG. 1, end 22 includes a plurality of features 24 formed in at least a portion of the surface of end 22. Similarly, as shown in FIG. 2, end 20 includes a features zone 26 adjacent to the periphery of end 20 that contains features 28 formed in at least a portion of the surface of features zone 26. In one embodiment, features 24 and features 28 are configured to engage each other. Features 24 and 28 can include recesses, protrusions or a combination of both recesses and protrusions, so that when features 24 and 28 are engaged with each other, there is preferably no relative rotational movement about an axis 68 (FIG. 3) of housing 36. An a further alternate embodiment, features 24 and 28 are force-fit together so that adjacent modular bodies 12 remain secured together outside of housing 36.

Once modular bodies 12 are installed in housing 36, not only are the modular bodies 12 prevented from relative rotational movement, but also axial movement along axis 68 (FIG. 3). In one embodiment, to secure modular bodies 12 from movement along axis 68 once a predetermined number of modular bodies 12 have been inserted in housing 36, a spacer 54 is brought into abutment with end 22 of the last modular body 12 installed. After installation of spacer 54, fasteners 56, such as lock nuts (see FIG. 3) are brought into secure engagement with spacer 54 and each other. In other words, modular bodies 12 that are in end-to-end contact are compressively secured between stop 46 and spacer 54 due to fasteners 56. As shown in FIG. 3, with regard to fluid flow 50, fluid enters end 38 of housing 36 and flows through the orifices 16 of modular bodies 12 toward end 40 of housing 36, including through openings 58 formed in spacer 54 and fasteners 56 prior to reaching end 40.

Figure 5:
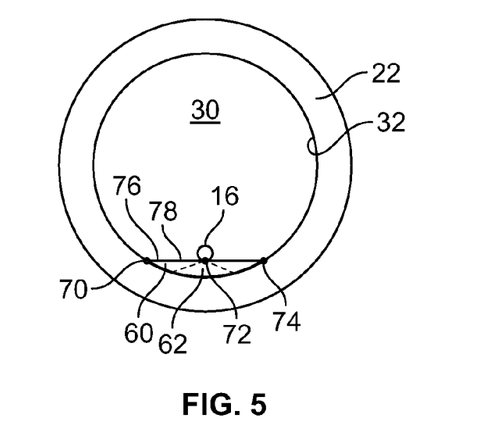
FIG. 5 is an end view of an embodiment of a modular body taken along lines 5-5 of FIG. 4 showing a chamber portion of the present disclosure.

In the installed position, orifices 16 of adjacent modular bodies 12 are fixed in a predetermined position or offset with respect to each other. In one embodiment, adjacent modular bodies 12 are fixed in a predetermined angular orientation or offset with respect to each other. In another embodiment, the offset is approximately 180°, and in a further embodiment, the orifices 16 are vertically aligned. In such an alignment, as shown in FIG. 4, particulates 62 entrained in fluid flow 50 that are either heavier or lighter than the moving fluid can "settle" in portions 60 of chambers 52 formed between adjacent modular bodies 12. Chamber 52 is defined by a surface 30 of base 14 and a surface 32 of wall 18 of one modular body 12, and by a surface 34 of base 14 of an adjacent modular body 12 (see FIGS. 1 and 2). As shown in FIGS. 4 and 5, portion 60 of chamber 52 is defined by the region between surface 32 on one side of the portion 60 and a bounding feature 76 that is tangent with or in close proximity with orifice 16. In one embodiment, as shown by FIG. 5, bounding feature 76 is a plane that is coincident with a chord 78, the opposed ends of the chord 78 intersecting surface 32 at points of intersection 70 and 74, and defining at least a point of tangency 72 with orifice 16. It is to be understood that surface 32 is not limited to circular profiles or planar bounding features 76. Chamber portion 60 of chamber 52 is intended to define a volume that is available to collect particulates 62 adjacent to orifice 16 without blocking orifice 16.

Figure 7:
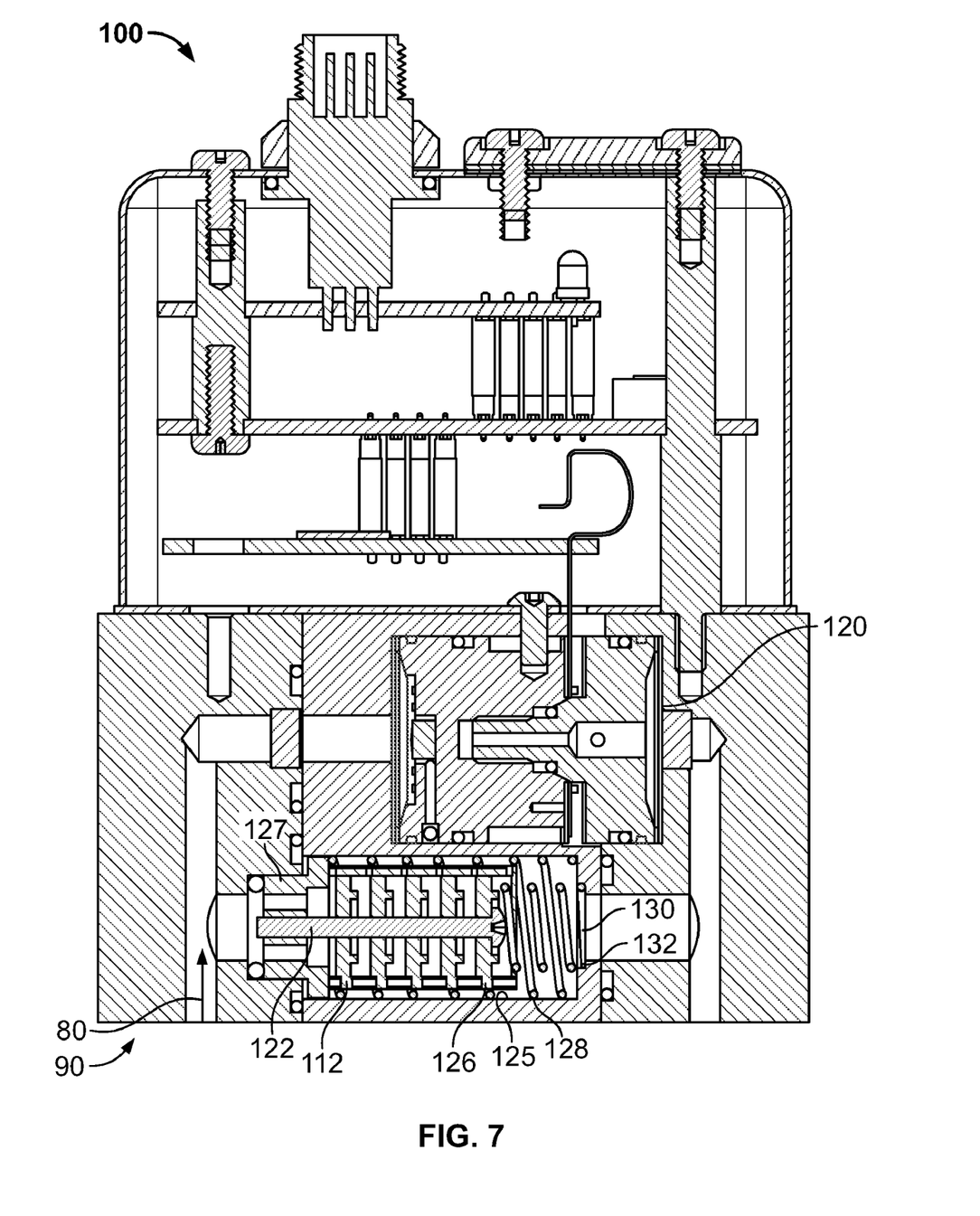
FIG. 7 is a cross section of an embodiment of a flow measure instrument having an overpressure relief feature of the present disclosure.
Figure 8:
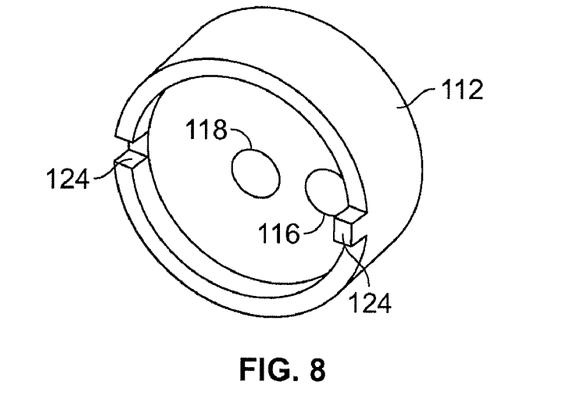
FIG. 8 is a perspective view of an alternate embodiment of a flow control device of the present disclosure.
Figure 9:
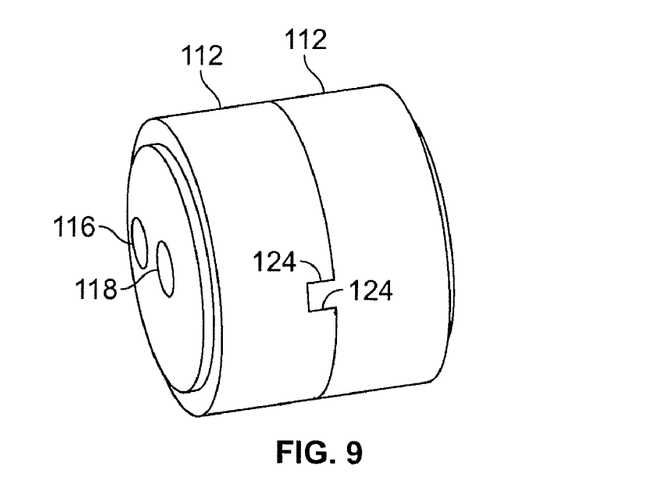
FIG. 9 is a perspective view of a mating pair of flow control devices of FIG. 8 of the present disclosure.
Figure 10:
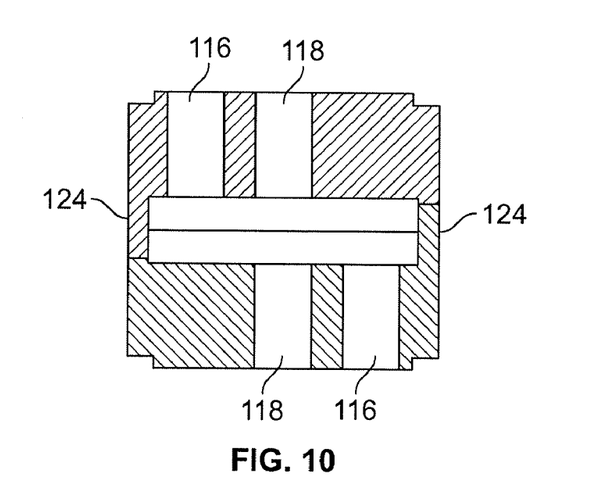
FIG. 10 is a cross-section taken along line 10-10 of FIG. 9 of the present disclosure.

FIGS. 8-10 shows an embodiment of modular body 112 in which interlocking features 124 are formed in the modular bodies to ensure an alternate orientation of the modular bodies. In one embodiment, features 124 are mating protrusions/recesses to ensure orifices 116 of adjacent modular bodies 112 are alternately disposed upon assembly. Modular body 112 further includes a centrally disposed orifice 118 so that upon assembly of a plurality of modular bodies, the corresponding orifices 118 are axially aligned and configured to receive a fastener 122 (see FIG. 7). In one embodiment, upon the fastener being sufficiently actuated to apply a predetermined compressive force between adjacent modular bodies 112, the compressive force substantially prevents fluid leakage between the modular bodies.

As shown in FIGS. 3 and 4, fluid flow 50 occurs in a non-linear path, due to the offset of orifices 16. As a result, the fluid loses energy in terms of pressure, providing a differential pressure signal that is proportional to the flow rate. Pressure loss across a flow restriction is related to velocity in accordance with the standard Bernoulli equation, equation 7. As shown in equation 7, due to conservation of energy, which equals a constant, pressure in inversely proportional to the square of the velocity of the fluid flow. By adding to the complexity of the non-linear flow path, the fluid velocity is reduced to fall into the laminar flow regime as defined by Reynold's number, equation 8.

$$\frac{v^2}{2} + gh + \frac{p}{\rho} = \text{constant} \quad [7]$$

$$Re = \frac{\rho v_s^2 / L}{\mu v_s / L^2} = \frac{\rho v_s L}{\mu} = \frac{v_s L}{\nu} = \frac{\text{Inertial forces}}{\text{Viscous forces}} \quad [8]$$

Figure 6:
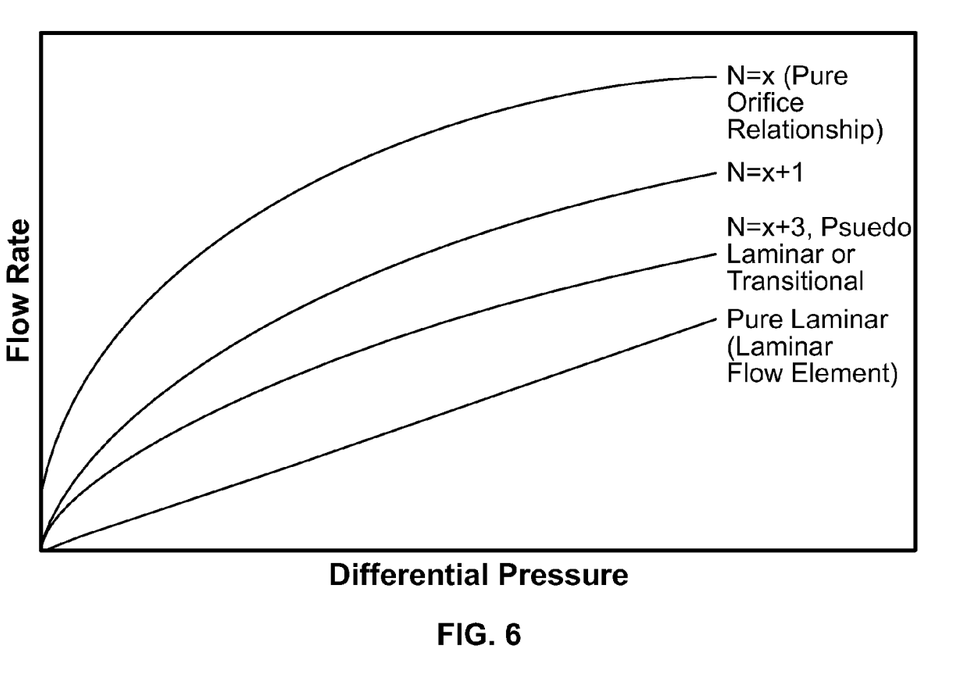
FIG. 6 is a general graphical representation of flow versus differential pressure using increasing numbers of modular flow control bodies and their corresponding flow regime of the present disclosure.

As shown graphically in FIG. 6, a general relationship between flow rate versus differential pressure is provided. N corresponds to the number of modular bodies disposed in a flow passageway. As the number of modular bodies increases, the flow regime is shown to transition from a purely orifice related (N=x) to pseudo laminar or transitional flow regime (N=x+3) which approaches laminar flow. It is appreciated that for general flow monitoring applications, in which accuracy of flow measurement is not as important as repeatability over time, use of a sufficient number of modular bodies to produce a pseudo laminar flow may provide a satisfactory indication of stable fluid flow or a stable process/system. Conversely, fluctuations in measured flow is an indication of an upset in the process, requiring attention.

Orifices 16 can be sized according to a fluid parameter. In one embodiment, the fluid parameter is a predetermined pressure drop upstream of the first modular body 12 in a flow metering device 10 and downstream of a last of the modular bodies 16, such as shown in FIG. 3, and as such as measured by respective pressure gauges 42 and 44. In another embodiment, the fluid parameter is a fluid flow rate. In yet another embodiment, the fluid parameter is a specific gravity of the fluid. In a further embodiment, the fluid parameter is fluid viscosity, because in laminar or pseudo laminar flow, the fluid flow rate becomes viscosity dependant rather than density dependent in the laminar regime as outlined in equation 1. It is to be understood that although the orifices 16 of substantially equal size can be utilized, such as previously discussed in equation 5, orifices 16 can be of different sizes (see equation 4). In one example, for a given total pressure differential between upstream and downstream pressure gauge or other pressure sensing instruments, the size of the orifices formed in the modular bodies for fluid flow therethrough can be maximized, while creating a measurable differential pressure. By providing a sufficiently non-linear fluid flow path, the flow/pressure relationship becomes dependent on fluid viscosity, and not fluid density, which corresponds to a laminar or pseudo laminar or transitional flow regime.

As previously discussed in the Summary, the number and size of orifices of modular bodies can be arranged in a flow control device to achieve a total predetermined total flow coefficient in response to a given flow parameter. Different embodiments of combinations of orifice sizes and numbers of modular bodies can be configured based on the equations previously discussed, to satisfy the flow parameter, with the number of modular bodies being increased, while simultaneously increasing the orifice sizes.

The combination of orifice bodies and numbers of modular bodies can also be assembled into an integrated combination flow restriction and pressure relief assembly or integrated assembly 100. As seen in FIG. 7, integrated assembly 100 incorporates the non-clogging flow and pressure attributes of the modular bodies, such as modular body 112, but additionally provides a safety pressure relief valve feature to allow a bypass of pressure past a fluid parameter measuring device 120, such as a differential pressure flow sensor assembly, to protect the device from an overpressure condition.

In response to a sudden pressure transient in fluid flow path 80 upstream of fluid parameter measuring device 120, modular assembly 90 moves within bore 125 to relieve the pressure transient. As further shown in FIG. 7, modular assembly 90 includes a plurality of modular bodies 112 secured together by a fastener 122 and having opposed end caps 126, 127. A centrally disposed resilient device 130, such as a helical spring, is configured to engage cap 126 at one end and a counterbore 132 formed in one end of bore 125 at the other end of resilient device 130. A larger resilient device 128, such as a helical spring, is disposed between one end of bore 125 adjacent to counterbore 132 and cap 127. In an alternate embodiment, one resilient device (128 or 130) may be used with modular assembly 90 to maintain modular assembly 90 in a seated position. However, as shown, in response to a sudden pressure transient causing an overpressure condition in fluid flow path 80, the overpressure overcomes the forces exerted by resilient devices 128, 130. That is, the overpressure in fluid flow path 80 urges cap 127 to move in direction 134, or to an unseated position, permitting fluid flow around modular assembly 90 to sufficiently reduce the pressure transient to prevent damage to fluid parameter measuring device 120.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A flow metering device comprising:
    at least two stackable modular bodies including at least one set of adjacent modular bodies, each modular body having an orifice for modulating fluid flow therethrough, the at least two modular bodies arranged such that the orifices between adjacent modular bodies are offset from each other; and
    wherein adjacent stacked modular bodies define a chamber having features for trapping particulates entrained in fluid flow without obstructing fluid flow through the orifices.

2. The device of claim 1, wherein adjacent modular bodies are offset 180 degrees from each other.

3. The device of claim 2, wherein the orifices are vertically aligned.

4. The device of claim 1, wherein the orifices are substantially the same size.

5. The device of claim 4, wherein the orifices are substantially circular.

6. The device of claim 5, wherein the orifices are sized according to a fluid parameter.

7. The device of claim 6, wherein the fluid parameter is a predetermined pressure drop upstream of a first of the at least two modular bodies and downstream of a last of the at least two modular bodies.

8. The device of claim 6, wherein the fluid parameter is a fluid flow rate.

9. The device of claim 6, wherein the fluid parameter is a specific gravity of the fluid.

10. The device of claim 6, wherein the fluid parameter is at least one of a pressure drop, a fluid flow rate, and a specific gravity of the fluid.

11. The device of claim 1, wherein the orifices have substantially the same flow coefficient.

12. A flow metering device comprising:
    at least two stackable modular bodies including at least one set of adjacent modular bodies, each modular body having an orifice having substantially the same flow coefficient for modulating fluid flow therethrough, the at least two modular bodies arranged such that the orifices between adjacent modular bodies are offset from each other; and
    wherein adjacent stacked modular bodies define a chamber for trapping particulates entrained in fluid flow without obstructing fluid flow through the orifices.

13. The device of claim 12, wherein adjacent modular bodies are offset 180 degrees from each other.

14. The device of claim 12, wherein the orifices are vertically aligned.

15. The device of claim 12, wherein the orifices are substantially the same size.

16. The device of claim 15, wherein the orifices are substantially circular.

17. The device of claim 12, wherein the orifices are sized according to a fluid parameter.

18. The device of claim 17, wherein the fluid parameter is a predetermined pressure drop upstream of a first of the at least two modular bodies and downstream of a last of the at least two modular bodies.

19. The device of claim 17, wherein the fluid parameter is at least one of a pressure drop, a fluid flow rate and a specific gravity of the fluid.

20. The device of claim 12, wherein each modular body includes a second orifice configured to receive a fastener to draw the at least two modular bodies together.

21. A flow metering device comprising:
    a modular assembly disposed in a seated position in a bore by a resilient device, the modular assembly comprising:
        at least two stackable modular bodies including at least one set of adjacent modular bodies, each modular body having an orifice for modulating fluid flow therethrough, the at least two modular bodies arranged such that the orifices between adjacent modular bodies are offset from each other; and
        wherein adjacent stacked modular bodies define a chamber having features for trapping particulates entrained in fluid flow without obstructing fluid flow through the orifices; and
    a fluid parameter measuring device disposed in fluid communication with the modular assembly; and
    wherein in response to a transient overpressure condition, the modular assembly is temporarily urged away from the seated position to relieve the transient overpressure condition to prevent damage to the measuring device.

* * * * *